United States Patent
Murphy et al.

(10) Patent No.: US 7,715,727 B2
(45) Date of Patent: May 11, 2010

(54) SYSTEM AND METHOD FOR TRANSMITTING ANALOG SIGNALS WITH A MODULATING RETROREFLECTOR AND HYBRID AMPLITUDE AND FREQUENCY MODULATION

(75) Inventors: James L Murphy, Huntington, MD (US); William S Rabinovich, Silver Spring, MD (US); G Charmaine Gilbreath, Burke, VA (US); Peter G Goetz, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 708 days.

(21) Appl. No.: 11/499,988

(22) Filed: Aug. 1, 2006

(65) Prior Publication Data
US 2007/0189779 A1 Aug. 16, 2007

Related U.S. Application Data

(60) Provisional application No. 60/704,043, filed on Aug. 1, 2005.

(51) Int. Cl.
*H04B 10/00* (2006.01)
(52) U.S. Cl. .................. 398/170; 398/169; 398/187
(58) Field of Classification Search ............. 398/169, 398/170, 183, 184, 185, 186, 187, 188, 141, 398/135, 136, 137, 138
See application file for complete search history.

(56) References Cited

U.S. PATENT DOCUMENTS

| | | | | |
|---|---|---|---|---|
| 4,887,310 | A | * 12/1989 | Meyzonnette et al. | ........ 398/170 |
| 4,953,156 | A | * 8/1990 | Olshansky et al. | ............ 398/76 |
| 4,987,607 | A | 1/1991 | Gilbreath et al. | |
| 5,661,585 | A | * 8/1997 | Feldman et al. | ............... 398/63 |
| 5,896,211 | A | * 4/1999 | Watanabe | .................... 398/76 |
| 6,154,299 | A | 11/2000 | Gilbreath et al. | |
| 6,344,846 | B1 | 2/2002 | Hines | |
| 6,624,916 | B1 | 9/2003 | Green et al. | |
| 7,054,563 | B2 | 5/2006 | Tsumura et al. | |

OTHER PUBLICATIONS

Biermann, M. L., Rabinovich, W. S., Mahon, R., and Gilbreath, G. C., "Design and Analysis of a Diffraction-Limited Cat's-Eye Retroreflector," Optical Engineering, vol. 41, Iss. 7, pp. 1655-1660 (Jul. 2002).

(Continued)

*Primary Examiner*—Hanh Phan
(74) *Attorney, Agent, or Firm*—Amy L. Ressing; Sally A. Ferrett (57) ABSTRACT

A system and method for encoding an analog input signal for optical transmission, including driving a voltage controlled oscillator with an analog input signal to produce a frequency modulated electrical signal having a frequency proportional to the amplitude of the input signal, and applying the frequency modulated electrical signal to a multiple quantum well modulating retroreflector. The retroreflector receives optical energy from a laser source and modulates the optical energy with the frequency modulated signal to produce an output optical signal.

27 Claims, 9 Drawing Sheets

OTHER PUBLICATIONS

Creamer, N. G., Gilbreath, G. C., Meehan, T. J., Vilcheck, M. J., Vasquez, J. A., Rabinovich, W. S., and Goetz, P. G., "Interspacecraft Optical Communication and Navigation Using Modulating Retroreflectors," Journal of Guidance Control and Dynamics, vol. 27, Iss. 1, pp. 100-106 (Jan./Feb. 2004).

Davidson, F. M., Bucaille, S., Gilbreath, G. C., and Oh, E., "Measurements of Intensity Scintillations and Probability Density Functions of Retroreflected Broadband 980-Nm Laser Light in Atmospheric Turbulence," Optical Engineering, vol. 43, Iss. 11, pp. 2689-2695 (Nov. 2004).

Gilbreath, G. C., Rabinovich, W. S., Meehan, T. J., Vilcheck, M. J., Stell, M., Mahon, R., Goetz, P. G., Oh, E., Vasquez, J. A., Cochrell, K., Lucke, R. L., and Mozersky, S., "Progress in Development of Multiple-Quantum-Well Retromodulators for Free-Space Data Links," Optical Engineering, vol. 42, Iss. 6, pp. 1611-1617 (Jun. 2003).

Gilbreath, G. C., Rabinovich, W. S., Meehan, T. J., Vilcheck, M. J., Mahon, R., Burris, R., Ferraro, M., Sokolsky, I., Vasquez, J. A., Bovais, C. S., Cochrell, K., Goins, K. C., Barbehenn, R., Katzer, D. S., Ikossi-Anastasiou, K., and Montes, M. J., "Large-Aperture Multiple Quantum Well Modulating Retroreflector for Free-Space Optical Data Transfer on Unmanned Aerial Vehicles," Optical Engineering, vol. 40, Iss. 7, pp. 1348-1356 (Jul. 2001).

Gilbreath, G.C., Creamer, N.G., Rabinovich, W. S., Meehan, T.J., Vilchek, M.J., Vasquez, J.A., Mahon, R., Oh, E., Goetz, P.G., and Mozersky, S., "Modulating retro-reflectors for space, tracking, acquisition, and ranging using multiple quantum-well technology", Proc. SPIE 4821, pp. 494-507 (Dec. 2002).

Hallstig, E., Ohgren, J., Allard, L., Sjoqvist, L., Engstrom,D., Agren, D., Junique, S., Noharet, B., "Retrocommunication using electroabsorption modulators and nonmechanical beam steering", Optical Engineering, vol. 44, Iss. 4, Apr. 2005, pp. 045001-1-045001-8.

Katzer, D. S., Rabinovich, W. S., Ikossi-Anastasiou, K., and Gilbreath, G. C., "Optimization of Buffer Layers for InGas/AlGaAs Pin Optical Modulators Grown on GaAs Substrates by Molecular Beam Epitaxy," Journal of Vacuum Science & Technology B, vol. 18, Iss. 3, pp. 1609-1613 ( May/Jun. 2000).

Murphy, J.L., Gilbreath, G.C., Rabinovich, W.S., Sepantaie, M.M., and Goetz, P.G., "FM-MRR analog audio system", Proc. SPIE 5892, pp. 58921X1-58921X8 (Oct. 2005).

Murphy, J.L., Gilbreath, G.C., Rabinovich, W.S., Sepantaie, M.M., and Goetz, P.G., "FM-MRR analog audio system", poster, SPIE Conference, Free Space Laser Communications V, Aug. 1, 2005.

Namazi, N., Burris, H. R., Conner, C., and Gilbreath, G. C., "Synchronization and Detection of Binary Data in Free-Space Optical Communication Systems Using Haar Wavelet Transformation," Optical Engineering, vol. 45, Iss. 1, pp. 015001-1-015001-13 (Jan. 2006).

Rabinovich, W.S., Goetz, P.G., Mahon, R., Swingen, L., Murphy, J., Gilbreath, G.C., Binari, S.C., and Waluschka, E., "Performance of cat's eye modulating retro-reflectors for free-space optical communications", Proc. SPIE 5550, pp. 104-114 (Oct. 2004).

Rabinovich, W. S., Mahon, R., Burris, H. R., Gilbreath, G. C., Goetz, P. G., Moore, C. I., Steil, M. F., Vilcheck, M. J., Witkowsky, J. L., Swingen, L., Suite, M. R., Oh, E., and Koplow, J., "Free-Space Optical Communications Link at 1550 Nm Using Multiple-Quantum-well Modulating Retroreflectors in a Marine Environment," Optical Engineering, vol. 44, Iss. 5, pp. 056001-1-056001-12 (May 2005).

Walters, R. J., Murphy, J. L., Rabinovich, W. S., Gilbreath, G. C., Wilt, D. M., Smith, M. A., Krasowski, M. J., Jenkins, P. P., Scheiman, D., Warner, J. H., Messenger, S. R., Lorentzen, J. R., and Summers, G. P., "Photovoltaically Powered Modulating Retroreflectors," Optical Engineering, vol. 45, Iss. 3, pp. 034003-1-034003-6 (Mar. 2006).

Gilbreath, G.C., Rabinovich, W.S., Moore, C.I., Burris, H.R., Mahon, R., Grant, K.J., Goetz, P.G., Murphy, J.L., Suite, M.R., Stell, M.F., "Progress in laser propagation in a maritime environment at the Naval Research Laboratory" Proc. SPIE, vol. 5892, pp. 58921V (2005); conference date Jul. 31, 2005; online publication date Sep. 12, 2005.

Rabinovich W., et al., "Free-Space Optical Communications Link at 1550nm using Multiple-Quantum-Well Modulating Retroreflectors in a Marine Environment", Optical Engineering, vol. 44, No. 5, pp. 056001-1-056001-12, May 2005.

Gilbreath, G.C., Rabinovich, W., "Large-Aperture Multiple Quantum Well Modulating Retroreflector for Free-Space Optical Data Transfer on UAVs", NRL Review, 2001.

Gilbreath, G.C., et al., "Real Time Video Transfer Using Multiple Quantum Well Retromodulators", Proc. SPIE, Aug. 2002, vol. 4821, pp. 155-162.

Goetz, P.G., et al. "Modulating Retroreflector Implementation of MIL-STD-1553 Protocol with Free-Space Optics", IEEE Aerospace Conference, Mar. 2003, Vol. 1-8 Issue 5, pp. 1799-1808.

Goetz, P.G., et al., "Multiple Quantum Well-Based Modulating Retroreflectors for Inter- and Intra-Spacecraft Communication", Proc. SPIE, Jan. 2006, vol. 6308, pp. 6308A-1-11.

Goetz, P.G., et al., "Practical Considerations of Retroreflector Choice in Modulating Retroreflector Systems", IEEE LEOS 2005 Summer Topicals, vol. TuA3.5, pp. 22-27, conference date Oct. 2005.

Wasiczko, L.M., et al., Optical Communication and Navigation for Spacecraft Docking Using Modulating Retroflectors. Proc. SPIE, vol. 5892, pp. 117-125, Sep. 2005.

Moore, C.I, et al., "Spatial Intensity Correlation and Aperture Averaging Measurements in a 20-mile Retroreflected Lasercom Link", Proc. SPIE, Jan. 2004, vol. 5160, pp. 474-482.

* cited by examiner

SYSTEM AND METHOD FOR TRANSMITTING ANALOG SIGNALS WITH A MODULATING RETROREFLECTOR AND HYBRID AMPLITUDE AND FREQUENCY MODULATION

CROSS-REFERENCE TO RELATED APPLICATIONS

This Application is a nonprovisional of provisional (35 USC 119(e)) application 60/704043 filed on Aug. 1, 2005, the entire disclosure of which is incorporated by reference.

BACKGROUND OF THE INVENTION

Modulating retroreflectors using multiple quantum well technology are described in U.S. Pat. No. 6,154,299, the disclosure of which is incorporated by reference in its entirety. Additional information regarding multiple quantum well retroreflectors is found in G. C. Gilbreath, et. al., "Progress in development of multiple quantum well retro-modulators for free-space data links", Optical Engineering, 42(6), 1611-1617 (2003), in W. S. Rabinovich, et.al, "Free-space Optical Free-Space Communications Link at 1550 nm using Multiple Quantum Well Modulating Retroreflectors in a Marine Environment", Optical Eng., 44(5), pp. 056001-056012 (2005).

Retroreflectors are also disclosed in Mark. L. Bierman, et. al., "Design and analysis of a diffraction limited cat's eye retroreflector", Opt. Eng., 41(7), pp. 1655-1660 (2002), R. J. Walters et al., "Photovoltaically powered modulating retroreflectors", Optical Engineering, March 2006, Vol. 45, Issue 3, pp. 034003-1-034003-6, D. S. Katzer et al., "Optimization of buffer layers for InGaAs/AlGaAs PIN optical modulators grown on GaAs substrates by molecular beam epitaxy", J. Vac. Sci Technol. B, May/June 2000, Vol. 18, Issue 3, pages 1609-1613.

A hybrid free space infrared communication link that supports audio transmission is described in J. L. Murphy et al., "FM-MRR Analog Audio System", Proceedings SPIE 5892 (September 2005).

DETAILED DESCRIPTION OF PREFERRED EMBODIMENTS

An embodiment of the invention is directed to a method for encoding an analog input signal for optical transmission, including driving a voltage controlled oscillator with an analog input signal to produce a frequency modulated signal having a frequency proportional to the amplitude of the input signal, and applying the frequency modulated signal to a multiple quantum well modulating retroreflector.

In exemplary embodiments, the multiple quantum well modulating retroreflector receives optical energy from a laser source and modulate the optical energy with the frequency modulated signal to produce an output optical signal. The output optical signal is a frequency modulated square wave signal.

An embodiment of the invention is directed to a method for encoding an analog input signal for optical transmission, including applying a frequency modulated electrical signal to a multiple quantum well modulating retroreflector, the multiple quantum well modulating retroreflector receiving optical energy from a laser source and modulating the optical energy with the frequency modulated signal to produce an output optical signal.

An embodiment of the invention is directed to a method for interrogating a remote station with an optical signal, including transmitting an optical beam toward the remote station, receiving a modulated optical beam from the remote station, and demodulating the modulated optical beam. The modulated optical beam is modulated by application of a frequency modulated electrical signal to a multiple quantum well modulating retroreflector.

An embodiment of the invention is directed to an optical communication system including a voltage controlled oscillator for receiving an analog input signal and generating a frequency modulated electrical signal having a frequency proportional to the amplitude of the input signal, and a multiple quantum well modulating retroreflector arranged to receive frequency modulated electrical signal, to receive an optical beam from a direction, to modulate the received optical beam with the frequency modulated electrical signal, and to direct the modulated optical beam in the direction. The system can also include an optical source directing the optical beam toward the modulating retroreflector, and a receiver for receiving the modulated optical beam.

DETAILED DESCRIPTION OF THE INVENTION

Figure 1:
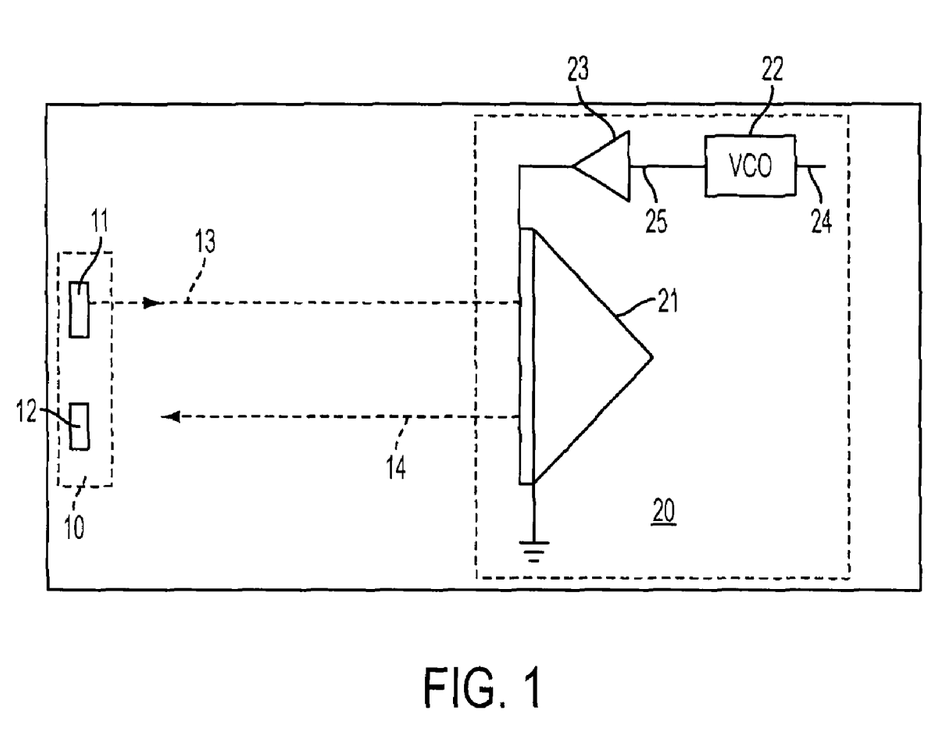
FIG. 1 illustrates an exemplary embodiment of a system for transmitting communication signals using a multiple quantum well modulating retroreflector.

FIG. 1 illustrates an exemplary embodiment of a system for transmitting communication signals using a multiple quantum well modulating retroreflector (MQW-MRR).

A base station 10 includes a laser transmitter 11 and a receiver 12. The laser transmitter 11 transmits an optical beam 13 toward a remote station 20. The remote station 20 has a multiple quantum well modulating retroreflector 21 that impresses a signal on the optical beam 13, and reflects the modulated beam 14 back toward the base station 10. The remote station 20, also includes a voltage controlled oscillator (VCO) 22 that converts an analog signal 24 to a frequency modulated electrical signal. The remote station also includes a driver 23 for driving the modulating retroreflector with the frequency modulated electrical signal 25.

In an exemplary embodiment, the laser transmitter 11 produces a continuous wave optical beam at a predetermined frequency. In an exemplary embodiment, the laser produces optical energy in the infrared band (approximately 0.7 microns-300 microns in wavelength), although smaller or larger laser wavelengths are also suitable. For example, the laser can be a blue green laser operating at approximately 500 nm.

In an exemplary embodiment, the modulating retroreflector 21 is a multiple quantum well modulating retroreflector and includes both a modulator for impressing the frequency modulated electrical signal onto the optical beam and a retroreflector for directing the modulated optical beam back toward to the base station 10. The retroreflector can be a corner cube retroreflector, or a cat's eye retroreflector. One suitable retroreflector is described in U.S. Pat. No. 6,154,299 to Gilbreath et al.

The base station 10 and remote station 20 can be stationary or mobile land based sites or vehicles, ships, buoys, or other water-based locations, satellites, aircraft, or other vehicles suitable for use in free space, in Earth's or other planetary atmospheres, or any combination thereof.

The base station 10 receiver 12 for receiving the modulated optical beam from the remote station. The receiver can be a photodiode or other electro-optic device that converts the AM optical signal back to an FM electrical signal. This signal can then be demodulated using a phase locked loop receiver (PLL) or other suitable demodulation device. The output of the demodulator is an analog signal that matches the analog signal impressed on the optical beam by the modulating retroreflector 21.

Figure 2:
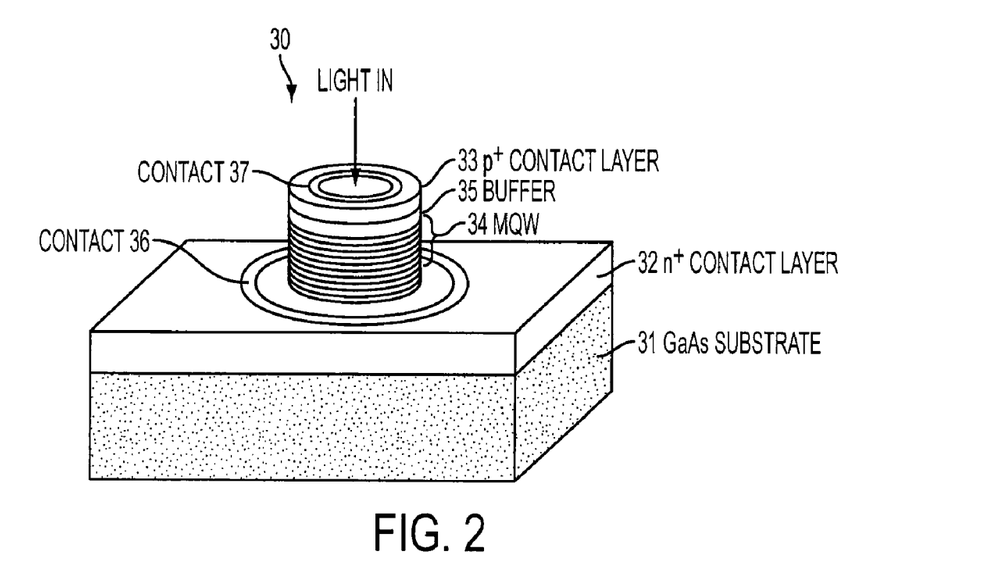
FIG. 2 illustrates the modulator portion of an exemplary modulating retroreflector.

The modulator portion 30 of an exemplary modulating retroreflector 21 is illustrated in FIG. 2, and is a semiconductor-based optical switch based on multiple quantum wells. The modulator can be grown by molecular-beam epitaxy. The modulator has many alternating layers 34 of GaAs, AlGaAs, and InGaAs deposited on a semiconductor wafer or substrate 31. The substrate 31 should be a material that is transparent at the desired optical wavelength, for example, at the wavelength of the laser is expected to interrogate the remote station.

In an exemplary embodiment for operation at about 987 nanometers, the layers 34 are each approximately 10 nanometers in thickness. The wafer can be any desired diameter, and in an exemplary embodiment, is a three inch diameter wafer. Electrically, the modulator is configured as a PIN diode, being grown on an n-type GaAs wafer and being capped by a p-type contact layer. An n+ contact layer 32 is arranged on the opposite surface of the multiple quantum well layers 34. A buffer layer 35 can be arranged between the p+ contact layer 33 and the multiple quantum well layers 34. The buffer layer prevents migration of the p dopant (generally Beryllium) into the undoped region.

Once grown, the wafer can be fabricated into discrete devices using a multi-step photolithography process with etching and metallization steps. Apertures can be in the range of 5 mm-1 cm, or larger.

Figure 3:
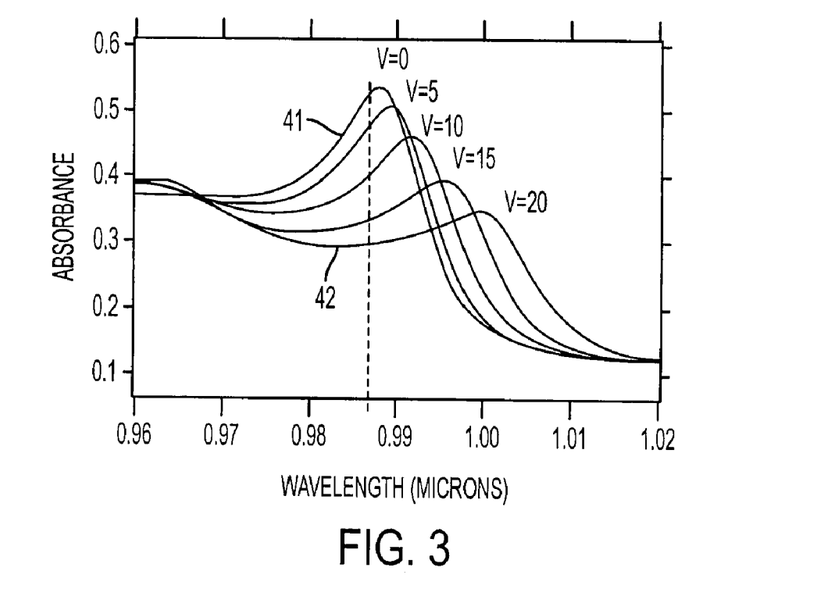
FIG. 3 illustrates the absorbance curves for an InGaAs/AlGaAs modulator with InGaAs wells surrounded by AlGaAs barriers.

FIG. 3 illustrates the absorbance curves for an InGaAs/AlGaAs modulator with 75 periods of InGaAs wells surrounded by AlGaAs barriers. Optically, the thin multiple quantum well layers induce a sharp absorption feature at a wavelength that is determined by the semiconductor layer material and their structure. In its quiescent state when the applied voltage is zero, the modulator absorbs most of the incident light at 987 nm, and therefore blocks the transmission of most incident light at 987 nanometers. When a voltage is applied, the absorbance curve shifts and more of the incident light at 987 nanometers is transmitted through the modulator. For example, when 0 volts is applied, the absorbance curve 41 shows that the modulator blocks over 50% of the incident light at 987 nm. When 15 volts is applied, more than 65% of the incident light at 987 nm is transmitted. This produces an electro-optic modulator with an on-off shutter effect for incident light that is directly driven by a voltage controlled oscillator.

Modulators can also be formed of InGaAs wells surrounded by AlGaAs barriers that operate at 850 nanometers. Modulators can also be grown of In/GaAs/AlGaAs for the 0.97-1.06 micron wavelength range where GaAs is transparent. Another suitable wavelength for a laser/modulator pair is 1550 nm. In an exemplary embodiment, the modulator is a coupled well modulator. This type can operate on a low voltage and provides a linear response.

Wavelengths that fall in the telecommunications band around 1550 nm are grown using the InGaAs/InAlAs/InP material system. Tuning within this band is achieved by changing the epitaxial layer structure either varying the widths of layers or the alloy composition. For wavelengths between 800-1.1 nm the InGaAs/GaAs/AlGaAs system is used. For other wavelengths different material systems can also be chosen. For example blue green modulators can use the GaN/InGaN/AlGaN system.

Figure 4:
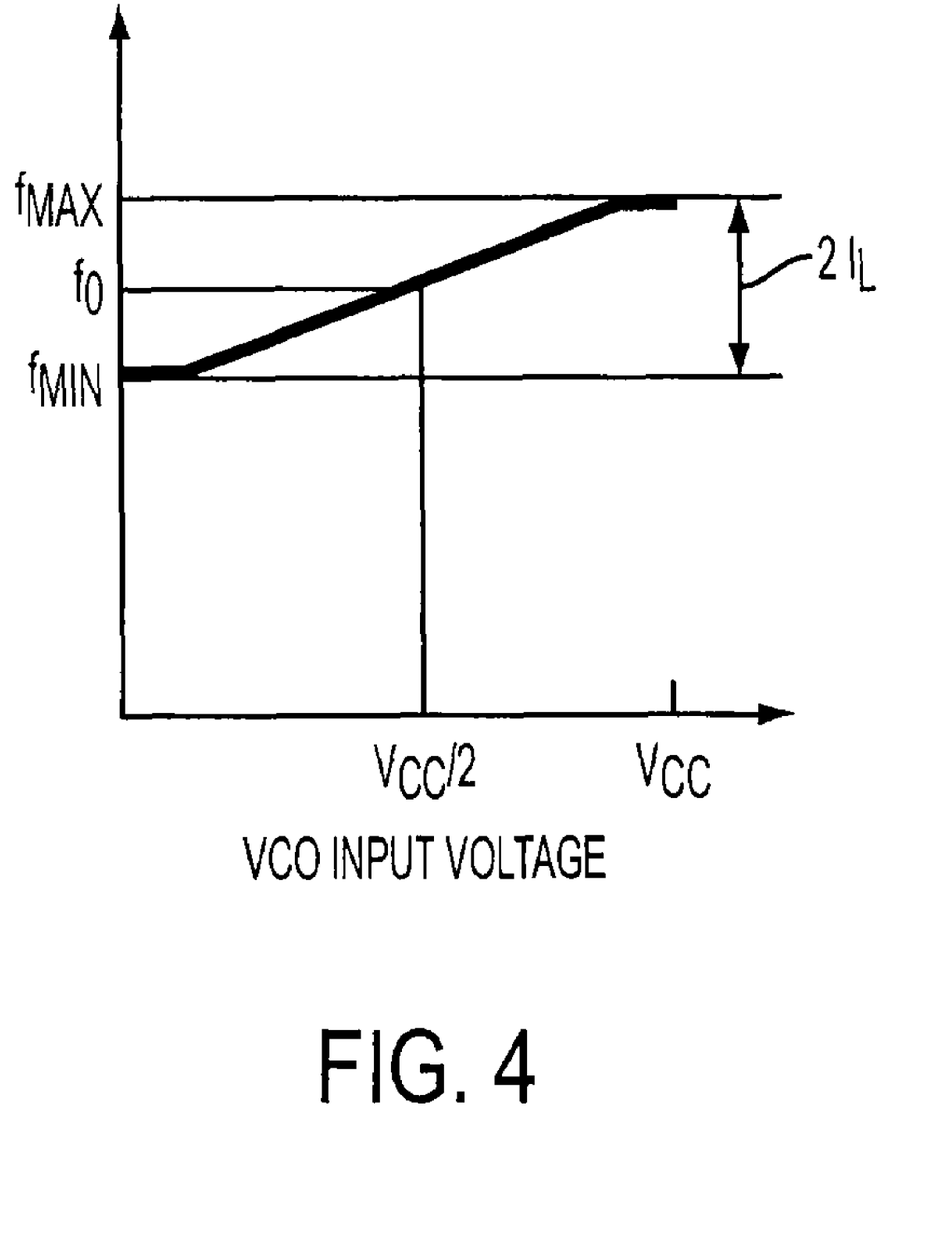
FIG. 4 illustrates a frequency vs. voltage transfer curve for a VCO device for use in an embodiment of the invention.

Referring again to FIG. 1, the VCO 22 converts the analog signal to a frequency modulated signal, and operates by generating an output frequency proportional to the input voltage. An example frequency vs. voltage transfer curve for a VCO device is shown in FIG. 4. The output of the VCO is a square wave whose frequency is proportional to the amplitude of the input signal. The square wave FM signal generated by the VCO can be considered a hybrid AM-FM signal, and is illustrated further in FIG. 5.

The voltage controlled oscillator produces a frequency modulated square wave electrical signal with a center frequency and a frequency deviation. In an exemplary embodiment, the center frequency is about 750 kHz and a maximum frequency deviation of approximately 30 kHz, resulting in a minimum frequency of 720 kHz and a maximum frequency of 780 kHz, although higher or lower center frequencies and frequency deviations can also be used. The choice of center frequency and deviation are application dependant. In order to reduce power consumption at the remote station, lower center frequencies are desirable since the power consumed by the modulator is a linear function of the center frequency. Conversely, higher center frequencies provide better signal to noise performance. The choice of frequency deviation is driven by the choice of center frequency. In general, larger deviations can lead to better signal to noise performance and increase the maximum range of the link.

One suitable voltage controlled oscillator is the VCO portion of a CMOS integrated circuit phase locked loop device available commercially under model number 74VHC4046 from Fairchild Semiconductor, headquartered in South Portland, Me. Other VCOs, or other devices producing a frequency modulated square wave whose frequency is proportional to the input voltage, are also suitable.

A driver 23 applies the resulting square wave frequency modulated signal to the MQW-MRR 21. The driver provides the current necessary to drive the MRR. A suitable driver is the Intersil EL7202CS with a maximum output current of 2 A and a minimum switching time of 10 ns, although other devices can also be used.

The MQW-MRR 21 imprints or encodes the frequency modulated signal 25 on the continuous wave optical beam 13 that is received by the MQW-MRR 21. The modulator 21 amplitude modulates the carrier CW optical beam, in a hybrid AM/FM encoding scheme. A continuous wave (CW) laser beam 13 incident upon the MQW-MRR 23 is modulated in amplitude by the square wave FM signal driving the MQW-MRR.

The modulating retroreflector 21 directs the optical signal back toward the base station 10. A photodiode or other electro-optic device in the receiver 10 converts the optical signal into a frequency modulated electrical signal. This frequency modulated electrical signal can then be demodulated using a phase locked loop receiver (PLL) or other suitable demodulation device. The output is the recovered analog signal.

The remote station can also include an amplifier to amplify the analog signal before the analog signal is fed to the VCO. In one embodiment, an analog audio signal is amplified by an audio operational amplifier OPA 134 chip with a volume control, commercially available from Texas Instruments, headquartered in Dallas, Tex.

The system can transmit any analog data stream provided the data bandwidth does not exceed the modulation bandwidth of the MQW-MRR, including but not limited to audio data, video data, seismic data, and data from acceleration and chemical sensors.

The system can use either corner cube modulating retroreflectors, or cat's eye modulating retroreflectors. Corner cube modulating retroreflectors have a modulation bandwidth of approximately 20 MHZ. Cat's eye modulating retroreflectors have a modulation bandwidth of 100 Mhz or greater.

The base station and the remote station can be a located remotely on land, ships, buoys, aircraft, satellites, and can be separated by several kilometers or more. Corner cube retromodulator links of up to 2 miles have been demonstrated. Links using cat's eye retroreflectors have a longer maximum range. The base station and the remote station can each be powered by any suitable AC or DC power supply, including but not limited to solar and battery power. The low power requirements for the units makes them very suitable to be powered by solar or battery power in remote locations where electrical power is scarce. Links can be made through materials that do not strongly absorb the laser wavelength, including but not limited to air and free space.

Figure 5:
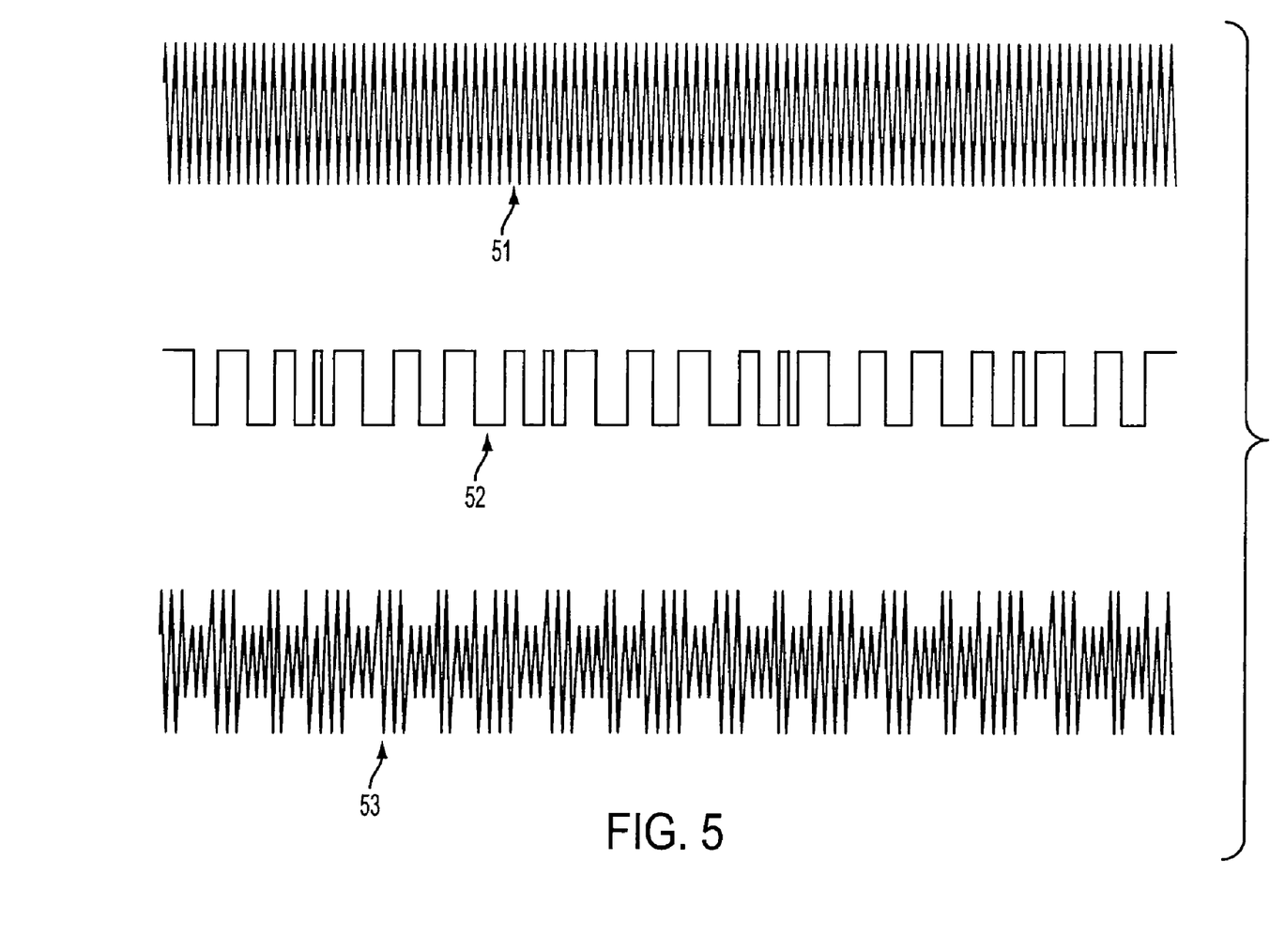
FIG. 5 illustrates the hybrid AM-FM modulation accomplished by the VCO and MQW-MRR in an embodiment of the invention.

FIG. 5 illustrates the hybrid AM-FM modulation accomplished by the VCO and MQW-MRR. The received optical beam has waveform 51. The VCO generates a frequency modulated square wave 52, whose frequency is proportional to amplitude of the input signal to the VCO. The MQW-MRR modulates the optical beam with the frequency modulated square wave 52 to produce an optical signal of waveform 53 that is reflected back in the direction of the received optical beam.

Figure 6:
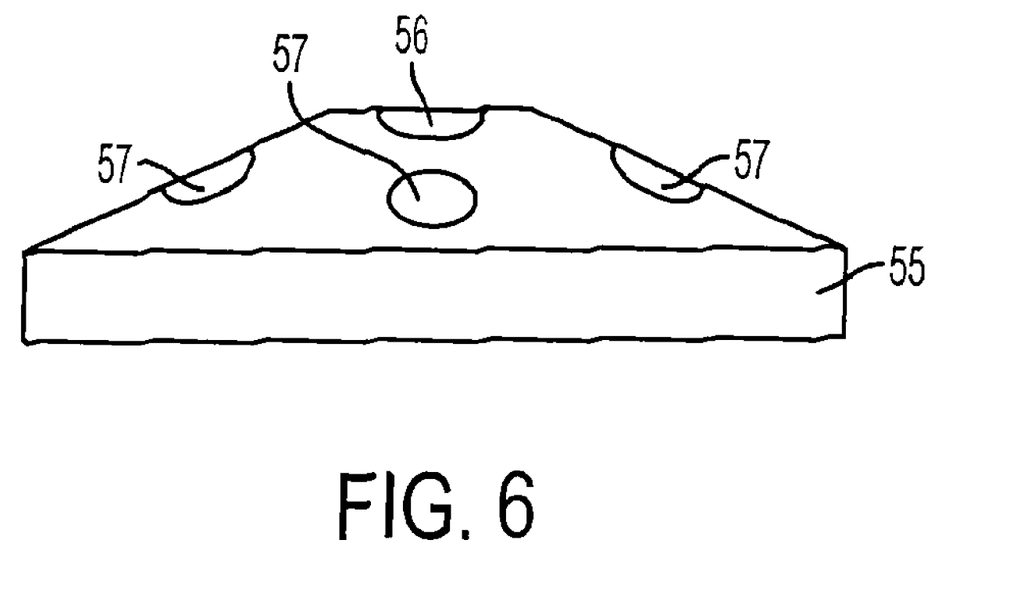
FIG. 6 illustrates an MQW-MRR array assembly in accordance with an embodiment of the invention.

FIG. 6 illustrates an MQW-MRR array assembly 55 that includes five MQW-MRRs oriented in different directions to provide a greater field of regard than a single MRR. The five MQW-MRRs are located on a truncated conical portion of the assembly, one MRR 56 centrally located and four MRRs 57 surrounding the centrally located MRR facing in a different direction. Each MRR has a field of view of approximately 30 degrees. The field of view of the entire array is approximately 60 degrees. The MRRs are connected in parallel, each with its own driver. Each MQW-MRR in this assembly has a shutter diameter of approximately 6.3 mm. The MQW-MRRs are driven by a wavelet compression unit and an impedance matching circuit. The mounted retromodulator unit weighs approximately 10 grams and requires approximately 50 mW-100 mW to support a data rate of 4-6 Mbps, 30 fps of color video across links of kilometers.

Figure 7:
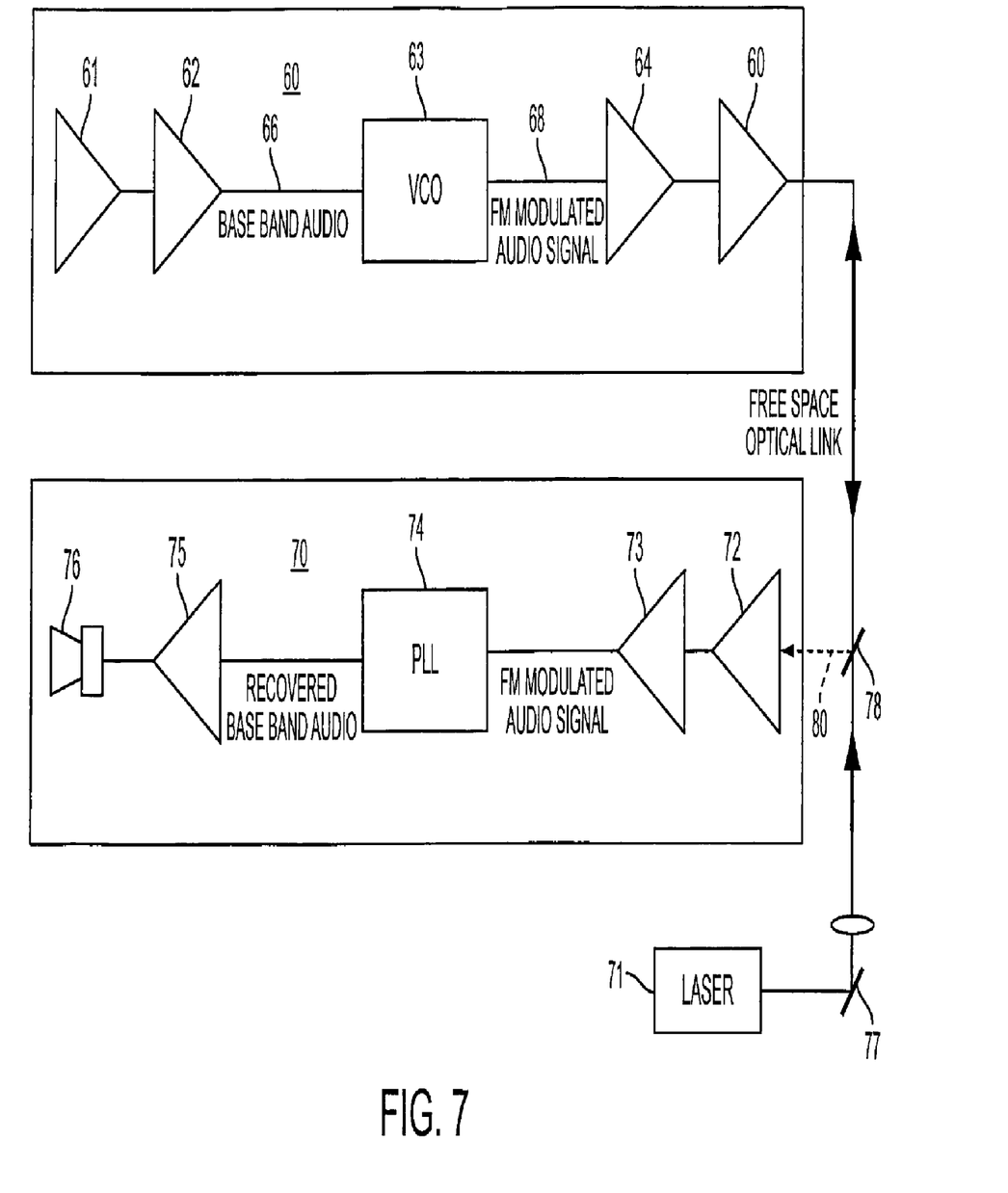
FIG. 7 illustrates an optical link set up to demonstrate the features of the frequency modulated MQW-MRR system.

FIG. 7 illustrates an optical link set up to demonstrate the features of the frequency modulated MQW-MRR system. A PC sound card or microphone 61 provides an analog audio input signal to the MQW-MRR modulator 65, via an audio amplifier 62, a VCO 63, and an MRR driver 64. The PC sound card provides a variety of audio signals including pure tones, human speech and music as an input signal to demonstrate the performance of the system.

This demonstration unit has a maximum range of about 10 meters, limited primarily by the power of the 1 mW laser used. Longer ranges can be achieved with a higher power laser.

The interrogator unit in the base station 70 has a monostatic design in which the transmit and receive portions share a single aperture, in order to minimize parallax effects inherent in a short range link. In this example, the laser interrogator 70 is a fiber-coupled 1550 nm source with a maximum output of 1.5 mW. The output of the laser is collimated. The beam retroreflected by the MQW-MRR 65 returns along the path of the output beam. The transmit and receive beams are differentiated using a 50/50 beam splitter 78. A gold coated steering mirror 77 eases alignment.

The return beam 80 is captured by a lens and coupled into a single mode fiber that is pigtailed to a PINFET detector 72. The detector 72 has a nominal bandwidth of 4 MB/s, and is AC coupled with a low frequency cut-off stage 73 of approximately 200 kHz. The output of the PINFET detector is then coupled to a demodulator circuit.

The demodulator circuit is a phase locked loop (PLL) receiver circuit 74. The demodulator circuit 74 operates by comparing the phase of the received FM signal to an internal frequency reference. The resulting phase error signal is used to adjust the reference frequency, minimizing the error.

After amplification by an audio amplifier, 75, the demodulated base band audio signal is output to a listener through speakers 76. Digital sound recordings can be made with a personal computer for later analysis.

By using a Fairchild 74VHC4046 (4) CMOS Phase Lock Loop chip as the PLL 74, the PLL 74 is matched to the VCO/modulator. The PLL chip 74 includes both the phase comparator and VCO frequency reference. The VCO behavior is controlled by 2 resistors and 1 capacitor. Referring to the FIG. 8 block diagram 90 of the PLL chip, R1 and C1 control the center frequency of the VCO. This is the output frequency when the input to the VCO is VCC/2. R2 controls the frequency offset. This is the minimum frequency the VCO will produce when the input to the VCO is 0 V. If R2 is omitted, the minimum frequency is essentially 0 Hz. For this demonstration, the center frequency is set to approximately 750 kHz, which is compatible with the photodiode's low frequency cutoff of around 200 kHz and the AC-coupling of the photodiode.

Figure 8:
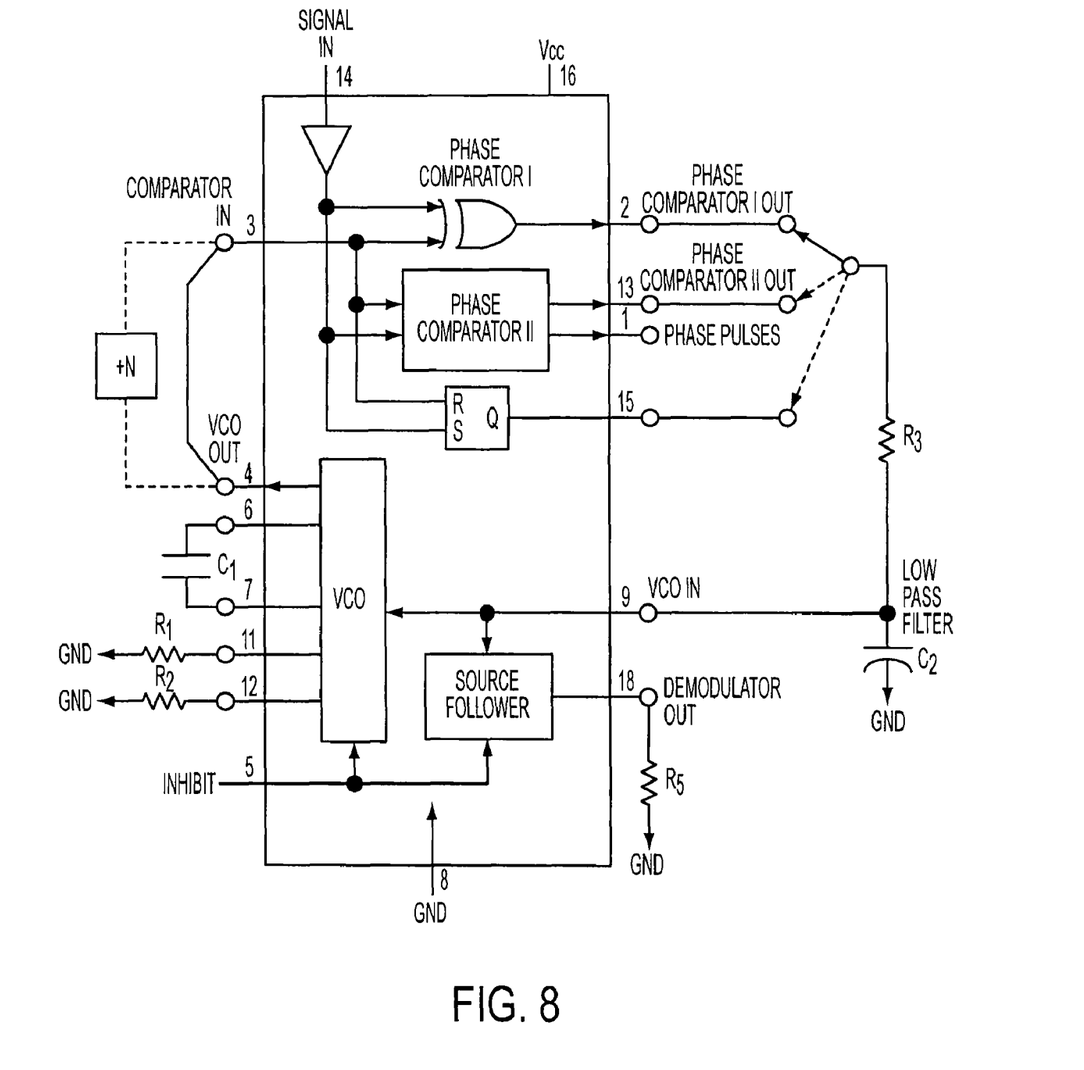
FIG. 8 illustrates schematically a phase locked loop chip for use in an embodiment of the invention.

The VCO is driven by the output of the phase comparator after being low pass filtered. R3 and C2 control the cutoff frequency of the filter. This frequency is chosen to match the bandwidth of the original analog signal. In this case, the bandwidth was set at around 50 kHz, ensuring negligible distortion of normal audio signals.

As seen in FIG. 8, the 74VHC4046 PLL chip contains three separate phase comparator circuits. Each one is best suited to a particular type of input signal. The VHC4046 is a low power phase lock loop utilizing advanced silicon-gate CMOS technology to obtain high frequency operation both in the phase comparator and VCO sections. The 74VHC4046 contains a low power linear voltage controlled oscillator (VCO), a source follower, and three phase comparators. The three phase comparators have a common signal input and a common comparator input. The signal input has a self biasing amplifier allowing signals to be either capacitively coupled to the phase comparators with a small signal or directly coupled with standard input logic levels. Phase Comparator I is an exclusive OR (XOR) gate. It provides a digital error signal that maintains a 90 phase shift between the VCO's center frequency and the input signal (50% duty cycle input waveforms). In this demonstration embodiment, the input signal has a fixed duty cycle of 50%, making Phase Comparator I the best choice.

Referring again to FIG. 7, the base station 70 also includes an audio amplifier 75 to allow the PLL receiver 74 to drive a small speaker 76, headphones, or other audio device. In this embodiment, the amplifier 75 is a model OPA134 operational amplifier in combination with a model BUF364 voltage buffer, both of which are commercially available from Texas Instruments, headquartered in Dallas, Tex. The OPA134 is tailored by the manufacturer for audio applications and the BUF364 provides additional output current, allowing the circuit to drive a small speaker, headphones or other audio device. The voltage buffer is placed inside the feedback loop of the OPA134, to minimize the offset voltage of the voltage buffer.

Figure 9:
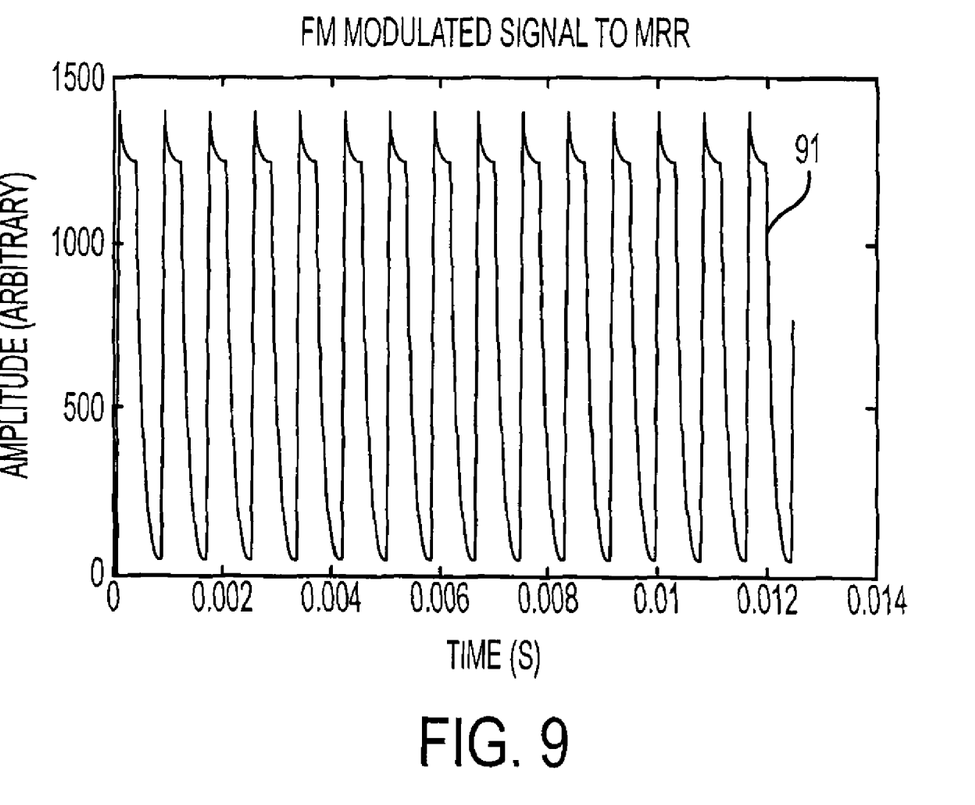
FIG. 9 illustrates a frequency modulated signal waveform generated in an embodiment of the invention.
Figure 10:
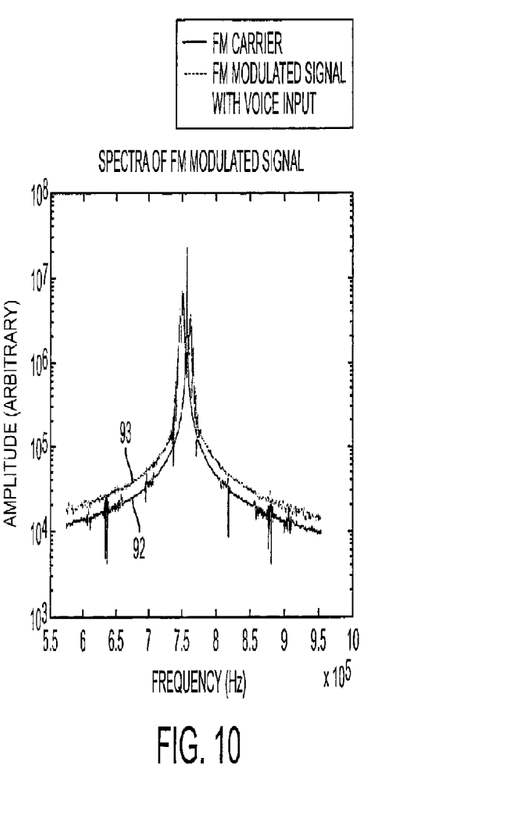
FIG. 10 illustrates an input analog signal before modulation of a modulating retroreflector.
Figure 11:
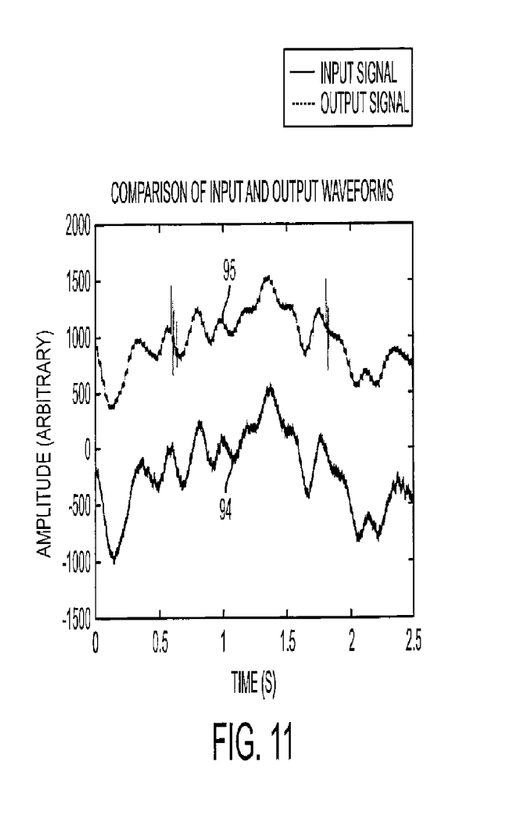
FIG. 11 illustrates an output waveform after modulating retroreflector and transmission to a remote receiver.

Results of testing of the FM-MRR audio system are summarized in FIGS. 9, 10 and 11. FIG. 9 is an example of the frequency modulated signal waveform 91 generated by the remote station's VCO 63. In this example, the audio input signal is amplified by OPA134 chip with a volume control. The input signal required a peak-to-peak voltage of approximately 4.5V to optimize audio performance, within the input range of the VCO. Using the entire frequency range of the VCO minimized distortion and improved the signal-to-noise ratio.

FIG. 10 shows the effect of driving the VCO 63 with a real audio signal compared with no input. The spectrum of the FM modulated signal without audio input is shown by curve 92, and a corresponding spectrum of the FM modulated signal with voice audio input is shown by curve 93. The audio information is carried in the frequency spectrum of the VCO output. FIG. 11 shows a comparison of the input audio signal 94 and the recovered version 95 after transmission over a free space optical link of approximately one meter on the optical bench of FIG. 7, with the recovered version offset from the input signal for clarity. The comparison shows that the recovered signal shows very little distortion and tracks the input with fidelity.

The complete transmitter circuit of the demonstration unit of FIG. 6, including the MRR, consumes less than 200 mW (40 mA at 5V) at full load. This favorably compares to the several watts that typically would be required to digitize, compress and transmit the same signal using digital techniques. This low power consumption makes the FM method described herein ideal for battery or solar powered applications.

FIG. 2 compares the power usage of a system with analog-encoding at the Sensor/MRR to power usage of digitized communication systems. This comparison shows that digital compression is the dominant loading factor at the Sensor/MRR end of a given asymmetric link. This comparison assumes transmission of real-time NTSC color video over a MQW CCMRR link with equivalent quality of service: Digital: 8 bits vs. Analog: 50 dB dynamic range, and conversion: 8 bits×6 dB/bit.

Analog modulation is susceptible to nonlinear effects in the atmosphere. Frequency modulation is less susceptible to these nonlinear effects, and a frequency modulated MQW-MRR can reduce the power and weight burden at the sensor/MRR end of a link and maintain viable signal-to-noise over an atmospheric channel.

Communication systems based on MRR technology have several advantages over other optical communications systems. One advantage is that only one laser is required. The laser interrogator unit is located at the base station; the remote station requires only a VCO and MQW-MRR modulator to modulate the optical beam and return the modulated signal to the base station. This system is particularly suitable for asymmetrical links where very little power is available on one end of the link.

Another advantage of a MRR optical communication system is that the MRR returns the modulated signal toward the source of the CW laser, so no pointing tracker is required at the MRR end of the system.

Another advantage is that MRRs have a high bandwidth capacity, and can be transmit even more complicated signals than simple audio data.

An advantage of the frequency modulated MQW-MRR system is that the power required relative to the transmission bandwidth of the FM-MRR system is relatively low. Transmission costs can be in the range of 10 nanowatts per Hertz, so that a 5 megabit per second bandwidth is available at 50 milliwatts, and a 50 megabit per second bandwidth is available at about 0.5 Watts.

For example, typical optical communications links transmit data in a digital format. For source data such as analog video or audio, the source information is generally digitized and compressed prior to transmission. The process of digitizing the data dramatically increases the required transmission bandwidth. Digitally compressing the data with a digital video compressor or other digital compressor can reduce this effect greatly but at the cost of greatly increased power requirements. The system and method of FIG. 1 or 7 does not require digital compression. Eliminating the need for digitization and compression at the sensor results in significant savings in both bandwidth and power.

The method and system described herein provides a robust, low power system capable of transmitting high quality audio information over a free space infrared link extending to multiple kilometers, depending on the characteristics of the Transmit/Receiver(interrogator) and the sensor/MRR unit at the data source. FM transmission requires a much less complex system, consisting only of an amplifier, VCO and MQW-MRR unit. This reduction in complexity leads to a similar reduction in the power required to transmit the same information. Several watts can be required to digitize, compress and transmit the same signal using digital techniques. The bandwidth required to transmit the FM signal is intrinsically lower than in a digital system as well and does not require compression to reduce bandwidth. Thus, the greatly reduced power requirements make this approach ideal for low and micro-power applications.

Obviously, many modifications and variations of the present invention are possible in light of the above teachings. It is therefore to be understood that the claimed invention may be practiced otherwise than as specifically described.

What is claimed is:

1. A method for encoding an analog input signal for optical transmission, the method comprising:

driving a voltage controlled oscillator with an analog input signal to produce a frequency modulated signal having a frequency proportional to the amplitude of the input signal; and applying the frequency modulated signal to a multiple quantum well modulating retroreflector.

2. The method according to claim 1, further comprising:
the multiple quantum well modulating retroreflector receiving optical energy from a laser source and modulating the optical energy with the frequency modulated signal to produce an output optical signal.

3. The method according to claim 2, wherein the output optical signal is a frequency modulated square wave signal.

4. The method according to claim 2, further comprising:
the multiple quantum well modulating retroreflector reflecting the output optical signal toward the laser source.

5. The method according to claim 1, wherein the frequency modulated signal produced by the voltage controlled oscillator is a square wave.

6. The method according to claim 1, wherein the analog input signal is an analog audio signal.

7. The method according to claim 1, wherein said multiple quantum well modulating retroreflector includes a corner reflector.

8. The method according to claim 1, wherein said multiple quantum well modulating retroreflector includes a cat's eye reflector.

9. The method according to claim 1, further comprising:
amplifying the analog input signal prior to said driving the voltage controlled oscillator.

10. A method for encoding an analog input signal for optical transmission, the method comprising:
applying the frequency modulated electrical signal to a multiple quantum well modulating retroreflector;
the multiple quantum well modulating retroreflector receiving optical energy from a laser source and modulating the optical energy with the frequency modulated signal to produce an output optical signal.

11. The method according to claim 10, further comprising:
generating a frequency modulated electrical signal.

12. The method according to claim 10, further comprising:
transmitting the output optical signal toward the laser source.

13. An optical communication system comprising:
a voltage controlled oscillator for receiving an analog input signal and generating a frequency modulated electrical signal having a frequency proportional to the amplitude of the input signal; and
a multiple quantum well modulating retroreflector arranged to receive frequency modulated electrical signal, to receive an optical beam from a direction, to modulate the received optical beam with the frequency modulated electrical signal, and to direct the modulated optical beam in the direction.

14. The system according to claim 13, wherein the frequency modulated electrical signal comprises a square wave.

15. The system according to claim 13, further comprising:
an amplifier for amplifying the analog input signal.

16. The system according to claim 13, further comprising:
a driver for applying the frequency modulated electrical signal to the multiple quantum well modulating retroreflector.

17. The system according to claim 13, further comprising:
an optical source directing the optical beam toward the modulating retroreflector.

18. The system according to claim 17, further comprising:
a receiver for receiving the modulated optical beam.

19. The system according to claim 18, wherein the optical source and the receiver are located at least one kilometer from the modulating retroreflector.

20. A method for encoding an analog input signal for optical transmission, the method comprising:
driving a voltage controlled oscillator with an analog input signal to produce a frequency modulated square wave signal having a frequency proportional to the amplitude of the analog input signal;
applying the frequency modulated square wave signal to a multiple quantum well modulating retroreflector; and
the multiple quantum well modulating retroreflector receiving optical energy from a laser source and modulating the optical energy with the frequency modulated square wave signal to produce an output optical signal.

21. The method according to claim 20, wherein the analog input signal is audio data.

22. The method according to claim 21, further comprising:
receiving the audio data from a microphone or PC sound card.

23. The method according to claim 20, wherein the analog input signal is video data.

24. The method according to claim 20, wherein the analog input data is seismic data.

25. The method according to claim 20, wherein the analog input data is data from acceleration sensors.

26. The method according to claim 20, wherein the analog input data is data from chemical sensors.

27. The method according to claim 20, further comprising applying the frequency modulated square wave signal to a plurality of drivers for a plurality of multiple quantum well retroreflectors in parallel.

* * * * *